Nov. 3, 1964 J. F. STEGER ETAL 3,155,771

ELECTRONIC CHASSIS MOUNTING BRACKET

Filed Oct. 31, 1962

INVENTORS
Joseph F. Steger
Mario J. Manetti
BY
Fidler, Beardsley & Bradley
ATTORNEYS

United States Patent Office 3,155,771
Patented Nov. 3, 1964

3,155,771
ELECTRONIC CHASSIS MOUNTING BRACKET

Joseph F. Steger, River Grove, and Mario J. Manetti, Oak Park, Ill., assignors to American Plasticraft Company, Chicago, Ill., a corporation of Illinois Filed Oct. 31, 1962, Ser. No. 234,427
2 Claims. (Cl. 174—158)

The present invention generally relates to mounting brackets and it more particularly relates to mounting brackets for mounting one chassis on another chassis and for electrically insulating the two chassis from one another.

In various types of electronic equipment such, for example, as television receivers, different portions of the circuit are operated with respect to a different reference or ground potential level and, for convenience, separate chassis members are commonly used for mounting these separate portions of the circuit. For example, television receivers commonly employ a main chassis operated at power line ground potential and a second chassis operated at a substantially higher potential. For convenience, of installation, it is desirable to mount the second or auxiliary chassis, which is very much the smaller of the two, on the larger or main chassis. Insulating types of brackets or clips have in the past been employed for this purpose, but they have not proven to be altogether satisfactory for the reason that they are difficult to assemble and, in some cases, difficult to mold.

Therefore, a principal object of the present invention is to provide a new and improved bracket for securing one member to another while simultaneously electrically insulating said members from one another.

Another object of the present invention is to provide a new and improved mounting bracket for mounting a first chassis on a second chassis.

A further object of the present invention is to provide a new and improved chassis mounting bracket which can be molded of an insulating plastic material.

The above and further objects and a better understanding of the present invention may be had by reference to the following detailed description taken in connection with accompanying drawing in which.

Figure 1:
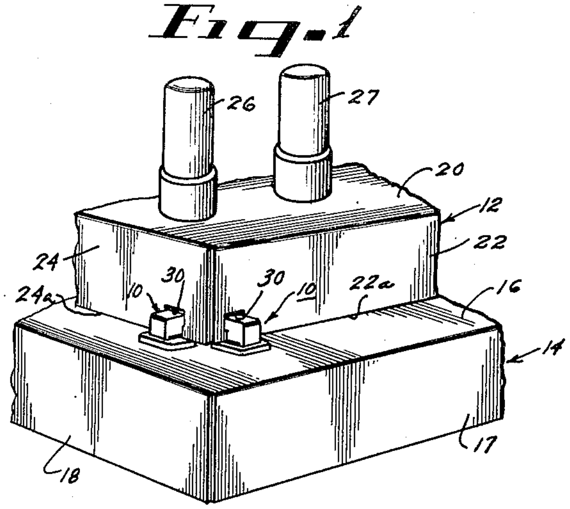
FIG. 1 is a fragmentary view of a pair of electronic chassis members secured together and insulated from one another by a plurality of mounting brackets embodying the present invention.
Figure 2:
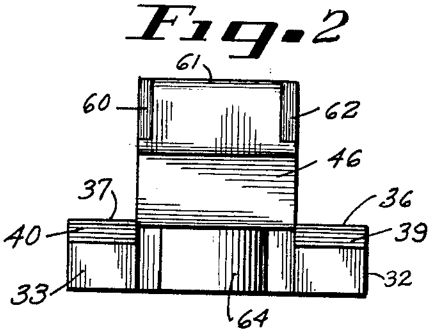
FIG. 2 is a front plan view of a mounting bracket embodying the present invention.
Figure 3:
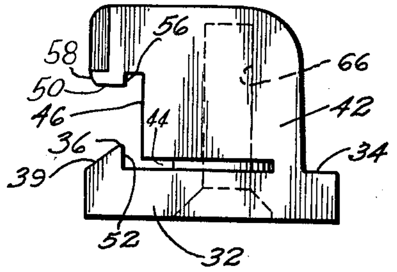
FIG. 3 is a side elevational view of the mounting bracket of FIG. 2.

Referring now to the drawing and particularly to FIG. 1 thereof, there is shown in fragmentary form a pair of unitary insulating and mounting brackets 10 being used to mount a first electric chassis 12 on a second electric chassis 14 and to maintain the two chassis in spaced-apart relationship. The chassis 14, which would ordinarily be the main chassis, is formed of a conducting metal and has a horizontal upper deck or surface 16 and a plurality of integral, depending side walls including the walls 17 and 18, whereby the chassis 14 is in the nature of an inverted box. The horizontal deck surface 16 may be used in the normal manner for mounting various ones of the electronic components making up the circuit such, for example, as tubes, transistors, transformers, and the like, and for purposes of illustrating the present invention the surface 16 is also used for mounting the chassis 12.

As shown, the chassis 12 comprises an upper horizontal surface portion or deck 20 and a plurality of depending side walls 22 and 24 which terminate in a plane at the bottom lower marginal edges 22a and 24a, respectively. Suitable electronic components such as the vacuum tubes 26 and 27 may be mounted on the chassis 12 in the customary manner.

As shown in FIG. 1, and as more fully described hereinafter, the chassis 12 is mounted on the chassis 14 by means of a plurality of the brackets 10, all of which are identical in construction. Each bracket 10 includes an upper portion projecting through a rectangular slot 30 in the associated vertical side wall of the chassis 12. Lower portions of the bracket 10 underlie the marginal edges 22a and 24a of the chassis 12 whereby to physically space the chassis 12 from the chassis 14 and thereby to insulate the two chassis from one another. The brackets 10 are secured to the chassis 14 by suitable fastening means (not visible in FIG. 1) such, for example, as self-tapping screws and they are attached to the chassis 12 merely by snapping them in place thereto.

Figure 4:
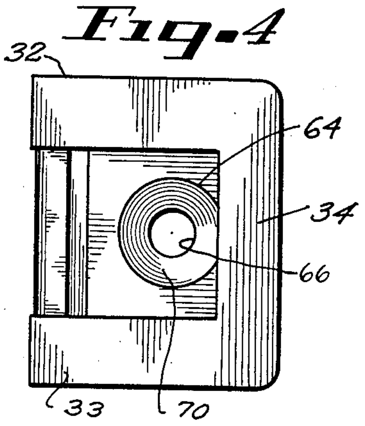
FIG. 4 is a bottom plan view of the mounting bracket of FIG. 2.

Each mounting bracket 10 is molded of a suitable plastic material such as nylon and, as best illustrated in FIG. 4, comprises a generally C-shaped base portion formed by a pair of arms 32 and 33 connected at their rearward ends by a rearwardly disposed cross bar 34. The base forming bracket portions 32, 33 and 34 terminate in a flat bottom surface which is adapted to rest flat on a supporting chassis surface such as the deck surface 16. Respectively provided at the forward marginal ends of the arms 32 and 33 is a pair of upstanding lips 36 and 37 which have sloping upper surfaces 39 and 40 whereby the lips taper downwardly toward the marginal ends of the arms 32 and 33.

The bracket 10 further includes a main body portion 42 connected solely to the rear cross bar 34 and disposed between and above the arms 32 and 33. A pair of slots 44 and 45 are thus located between the main body portion 42 and the arms 32 and 33. The slots 44 and 45 extend substantially throughout the full length of the arms 32 and 33, thereby to provide a substantial amount of flexibility between the arms and the body.

Figure 5:
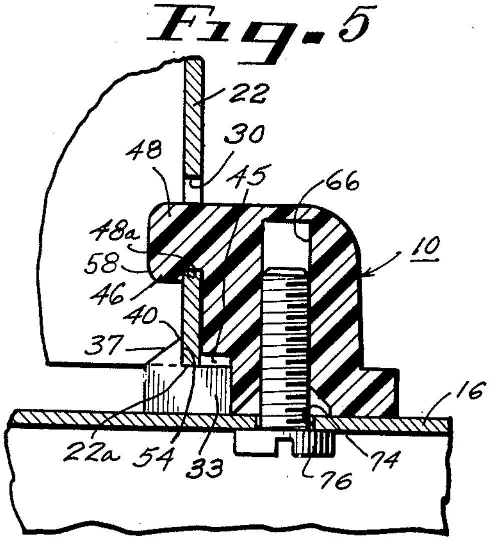
FIG. 5 is a sectional view taken along the center line of the mounting bracket of FIG. 2 and illustrating the bracket in use.

The body 42 has a forwardly facing flat vertical surface 46 for engaging a chassis wall. The surface 46 terminates at its upper end in a hook-like projection 48 including a depending lip 50 at the forward marginal edge thereof. The lips 36, 37 and 50 have respective rearwardly facing flat shoulder surfaces 52, 54 and 56 which lie in a common vertical plane, which face toward the body surface 46 and are spaced therefrom by a distance slightly greater than the thickness of the chassis side wall 22. These relative dimensions are best shown in FIG. 5. The forward face 58 of the lip 56 is beveled as are the forwardly facing edges 60, 61 and 62 of the projection 48.

As indicated hereinabove, the bracket 10 is adapted to be secured to the mounting surface of the chassis 14 as by a fastening means such as a screw, and, therefore, a generally cylindrical portion 64 which depends from the body portion 42 between the arms 32 and 33 is provided and terminates substantially in the plane of the bottom surfaces of the arms 32 and 33 and the cross bar 34. A blind, cylindrical hole 66 extends through the depending cylindrical portion 64 into the body 42.

In order to facilitate mounting of the chassis 12 upon the chassis 14, the hole 66 is counterbored at 70. This simplifies alignment of the holes 66 with punched out mounting holes in the chassis surface 16, which holes may vary in location because of the usual dimensional tolerances.

In order to use the mounting bracket 10 to secure a chassis, such as the chassis 12 on another chassis, such as the chassis 14, and as best shown in FIGS. 1 and 5, the slot 30 in the chassis side wall 22 is spaced from the lower marginal edge 22*a* by a distance equal to or very slightly greater than the distance between the bottom surface 48*a* of the projection 48 and the top surface of the arms 32 and 33. The slot 30 has a width at least equal to that of the projection 48 and a height equal to that of the projection 48 including the depending lip 50, so that the projection 48 may be inserted into the slot 30. With the projection 48 partly in the slot 30, the lower part of the bracket 10 is then pressed against the wall 22 causing the arms 32 and 33 to deflect downwardly as the inclined plane upper lip surfaces 39 and 40 ride under the marginal edge 22*a* of the chassis wall 22. When the lips 36 and 37 have passed beyond the inner side of the wall 22, the natural elasticity of the material from which the bracket 10 is molded causes the arms 32 and 33 to snap back up into place. At this time the forwardly facing body surface 46 is in substantial engagement with the opposing face of the chassis wall 22. The chassis 12 is then positioned on the mounting surface 16 so that the holes 68 therein are in substantial alignment with a plurality of punched-out holes 74 in the mounting surface 16. A plurality of screw type fasteners 76 are then inserted up through the holes 74 and threaded into the holes 68 in the bracket, thereby firmly to secure the bracket 10 to the chassis 14.

Although the dimensions of the bracket 10 will vary depending upon the particular application for which it is intended, the height of the legs 32 and 33 must be sufficiently great commensurate with such thickness to provide the necessary flexibility to enable assembly thereof to the upper chassis member 12. In this regard, it will be apparent that the cylindrical bracket portion 64 is preferably spaced from the arms 32 and 33, so as to not detract from this flexibility while at the same time providing a surface of substantial length for engagement with the fastening screw 76.

While the present invention has been described in connection with a particular embodiment thereof, it will be understood that those skilled in the art may make many changes and modifications without departing from the true spirit and scope of the invention. Therefore, it is intended by the appended claims to cover all such changes and modifications which fall within the true spirit and scope of the invention.

We claim:

1. A mounting bracket suitable for mutually insulating a pair of electrical chassis from one another and for securing the two chassis together, comprising a unitary molded member formed of an electric insulating material and having a C-shaped bottom mounting surface formed by a pair of forwardly extending arms and a laterally extending rear portion, a body connected to said rear portion, said body having therein a downwardly opening hole for receiving a fastening device, said hole being disposed forwardly of the points of attachment of said arms to said rear portion, said arms being spaced from said body at all points forward of said hole, each said arm having a lip disposed at the forward end portion thereof, each said lip providing a rearwardly facing shoulder, and a forwardly extending protrusion on said body disposed above said arms for reception in an aperture in one of said chassis.

2. In combination, a first mounting wall on a first electrical chassis, a second mounting wall on a second electrical chassis, said walls being flat and in mutually perpendicular relationship with one edge of said second wall extending adjacent to said first wall, and an insulating mounting bracket interconnecting said chassis, said bracket being formed of an insulating material and including a body portion having a downwardly opening hole for receiving a fastening device, a fastening device received in said hole and securing said bracket to said first mounting wall adjacent to said second mounting wall, a pair of arms on said bracket extending from a location rearwardly of said hole along said first mounting wall beneath said edge of said second mounting wall, said arms each having a lip disposed at the forward end portion thereof and providing a rearwardly facing shoulder engaging said second wall, said arms further having an inclined forward portion terminating at said shoulder, and a forwardly extending protrusion on said body disposed above said arms for reception in an aperture in said second wall, said protrusion having a depending flange portion lying along the rear of said second wall, and said aperture being spaced from said edge by a distance equal to the distance between said protrusion and the plane of the top surface of said arms, said aperture having a height exceeding the combined length of said protrusion and said flange.

References Cited in the file of this patent

UNITED STATES PATENTS

| | | |
|---|---|---|
| 2,935,554 | Steinke | May 3, 1960 |
| 2,974,703 | Rapata | Mar. 14, 1961 |
| 3,084,211 | Rapata | Apr. 2, 1963 |